UNITED STATES PATENT OFFICE.

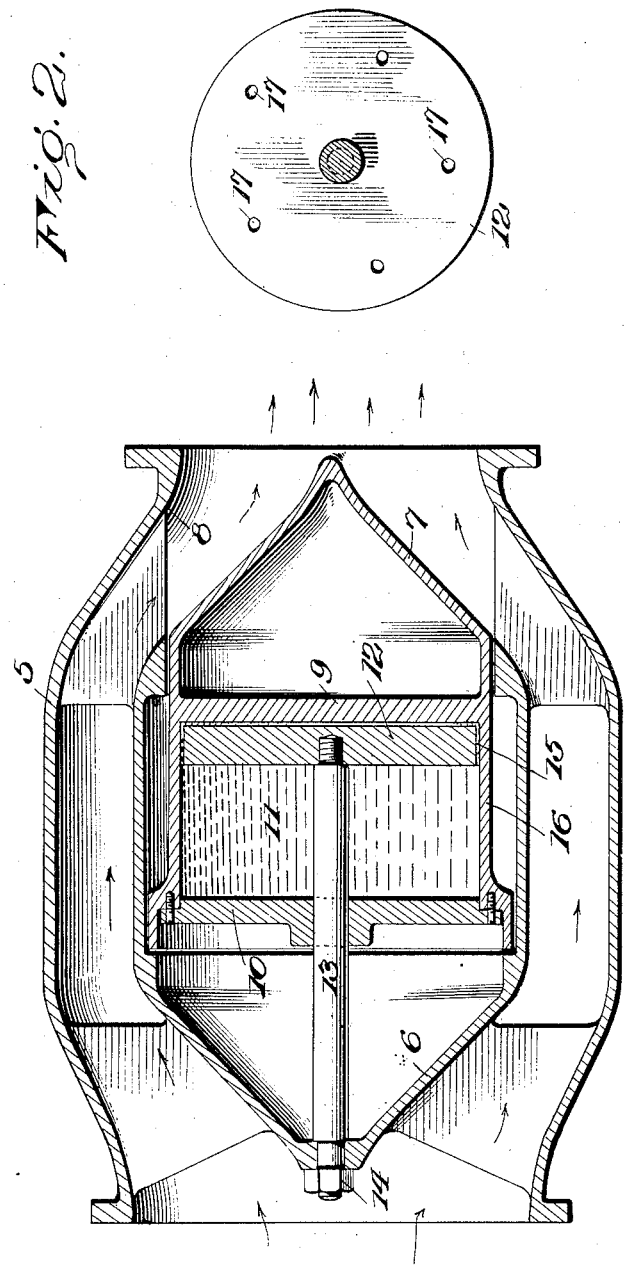

HARVEY BIRCHARD TAYLOR AND CHESTER W. LARNER, OF PHILADELPHIA, PENNSYLVANIA.

VALVE.

1,356,238.  Specification of Letters Patent.  Patented Oct. 19, 1920.

Application filed March 6, 1919. Serial No. 280,958.

*To all whom it may concern:*

Be it known that we, HARVEY BIRCHARD TAYLOR and CHESTER W. LARNER, citizens of the United States, residing at Philadelphia, in the county of Philadelphia and State of Pennsylvania, have invented certain new and useful Improvements in Valves, of which the following is a specification.

This invention relates to pressure operated plunger bowl valves for operation with distributing systems, such as, for example, the so-called Johnson valve for which Letters Patent No. 1,030,890 were granted to Raymond D. Johnson, July 2, 1912.

The principal object of the present invention is to provide simple and efficient means for regulating the rate of travel of the plunger element of the valve and for exerting a restraining influence upon it so as to prevent sudden accelerations of movement in the event of sudden changes of pressure such as are liable to occur, for example, in the control piping, or in the pipe line above or below the valve.

The nature, characteristic features and scope of the invention will more readily be understood from the following description taken in connection with the accompanying drawing, forming a part hereof, wherein—

Figure 1 is a view principally in longitudinal section of a Johnson valve embodying our improvements, the control piping being omitted as unnecessary to a proper understanding of the invention.

Fig. 2 represents a structural detail.

The numeral 5, represents a valve-body or housing which, as is usual, may be an enlargement of a conduit or pipe line. 6 indicates a fixed hollow valve element and 7 is its complemental telescopic plunger bowl for which, as is usual, an annular seat 8 is provided at the neck of the housing. This is the fundamental Johnson construction.

The plunger 7, according to our invention, is formed or provided with an end wall or partition 9 and with a removable head 10, the space between them constituting a cylinder or chamber 11 of definite volume, which is continually full of fluid. Said chamber is provided with a piston 12 whereof the rod 13 extends through an axial bore in the head 10 and is fixedly secured, as at 14, to the end of the stationary valve section 6. Evidently then, the piston rod 13 and piston 12 are to all intents and purposes an integral part of the stationary portions of the valve, while the cylinder head 10 moves with the plunger when the latter is moved to open or closed position.

During the closing stroke of the plunger the fluid between the cylinder head 10 and partition 9 is forced through the clearance 15 afforded by the fit between the piston 12 and the cylindrical wall 16. At the completion of the closing stroke all of the fluid in chamber 11 will be accommodated between piston 12 and the partition 9. During the opening stroke of the plunger the fluid will be forced in the opposite direction and will finally lie between the piston and the head 10.

Fig. 2 shows a modification in which the piston 12 is provided with restricted passages or holes 17 through which the fluid in chamber 11 may be transmitted from one side of the piston to the other.

Evidently the fluid-containing cylinder 11 and the related elements constitute a dash-pot, which exerts a restraining influence upon the plunger element of the valve through the displacement of fluid through or around the piston. This restraining action may be made as great or as small as may be necessary by varying the area of the passages by or through the piston 12. It is of importance to regulate the rate of travel of the plunger, and particularly to prevent sudden accelerations of movement thereof during the opening or closing stroke such as may for example, follow a sudden change of pressure between the external surface of plunger 7 and the internal parts of the valve, changes in the control pipe pressure, or sudden changes of pressure in the pipe line either above or below the valve.

The usual or any appropriate system of control may be employed for effecting the opening and closing strokes of the plunger.

It will be obvious to those skilled in the art to which the invention relates that various changes and modifications may be made without departing from the spirit and scope of the invention. Hence, the same is not limited other than required by the state of the prior art.

We claim and desire to secure by Letters Patent:—

1. In a valve the combination of a body, a fixed hollow valve element arranged in the body with a fluid way between, a hollow plunger bowl movable in the hollow valve element and coöperating therewith as a seat, an end wall and a head arranged in the bowl to constitute a cylinder to which there is access provided for fluid from the water way, and a piston arranged in said cylinder and fixed in respect to the body, substantially as described.

2. In a valve the combination of a body, a fixed hollow valve element arranged in the body with a fluid way between, a hollow plunger bowl movable in the hollow valve element and coöperating with the body as a seat and internally provided with a dash-pot cylinder having communication with the fluid way, and a dash-pot piston and piston rod attached to and wholly confined within the fixed hollow element, substantially as described.

In testimony whereof we affix our signatures.

HARVEY BIRCHARD TAYLOR.
CHESTER W. LARNER.